(12) United States Patent
Bettendorff et al.

(10) Patent No.: US 9,798,649 B1
(45) Date of Patent: Oct. 24, 2017

(54) DEBUGGING CODE CONTROLLING RESOURCE-CONSTRAINED INTELLIGENT DEVICES CONTEMPORANEOUSLY WITH EXECUTING OBJECT CODE

(71) Applicant: Landis+Gyr Innovations, Inc., Alpharetta, GA (US)

(72) Inventors: John Bettendorff, San Francisco, CA (US); Tribhuwan Chandra Kandpal, Alpharetta, GA (US)

(73) Assignee: Landis+Gyr Innovations, Inc., Alpharetta, GA (US)

( * ) Notice: Subject to any disclaimer, the term of this patent is extended or adjusted under 35 U.S.C. 154(b) by 23 days.

(21) Appl. No.: 15/146,042

(22) Filed: May 4, 2016

(51) Int. Cl.
*G06F 11/36* (2006.01)
(52) U.S. Cl.
CPC .................. *G06F 11/362* (2013.01)
(58) Field of Classification Search
CPC ....................................................... G06F 11/362
USPC ......................................................... 717/125
See application file for complete search history.

(56) References Cited

U.S. PATENT DOCUMENTS

| 5,394,544 | A | * | 2/1995 | Motoyama | .......... | G06F 11/3664 |
| | | | | | | 714/31 |
| 6,901,581 | B1 | * | 5/2005 | Schneider | ............ | G06F 11/3664 |
| | | | | | | 714/E11.212 |
| 8,136,096 | B1 | | 3/2012 | Johnson et al. | | |
| 2003/0188299 | A1 | | 10/2003 | Broughton et al. | | |
| 2005/0010912 | A1 | | 1/2005 | Adolphson et al. | | |
| 2005/0289400 | A1 | | 12/2005 | Kimura et al. | | |
| 2006/0259824 | A1 | | 11/2006 | Sohm et al. | | |

(Continued)

FOREIGN PATENT DOCUMENTS

WO 2011089478 7/2011
WO 2015061022 4/2015

OTHER PUBLICATIONS

Li et al., "Research of Stub remote debugging technique", Computer Science & Education, 2009 ICCSE '09, $4^{th}$ International Conference on IEEE, Piscataway, NJ, Jul. 25, 2009 pp. 990-994.

(Continued)

*Primary Examiner* — Qing Chen
*Assistant Examiner* — Clint Thatcher
(74) *Attorney, Agent, or Firm* — Kilpatrick Townsend & Stockton LLP

(57) ABSTRACT

This disclosure involves debugging code for resource-constrained intelligent devices contemporaneously with executing object code on the intelligent device. For example, object code is transmitted to a radio device. A program counter entry is provided from the radio device to a computer via a communication link contemporaneously with a pause in execution of the object code at the radio device. A correspondence between the program counter entry and a portion of assembly code, which was used to generate the object code, is identified and is used to generate a list of additional program counter entries for pausing the object code's execution. The list is provided from the computer to the radio device and is used to pause the object code's execution at the radio device. Log data is provided from the radio device to the computer for display after pausing the object code's execution at one of these program counter entries.

20 Claims, 10 Drawing Sheets

(56) References Cited

U.S. PATENT DOCUMENTS

| | | | |
|---|---|---|---|
| 2007/0226702 A1* | 9/2007 | Segger | G06F 11/3624 717/130 |
| 2008/0127149 A1 | 5/2008 | Kosche et al. | |
| 2008/0178143 A1* | 7/2008 | Dougan | G06F 8/20 717/100 |
| 2008/0244533 A1* | 10/2008 | Berg | G06F 11/3447 717/128 |
| 2008/0250397 A1* | 10/2008 | Dahms | G06F 11/3624 717/129 |
| 2009/0106604 A1 | 4/2009 | Lange et al. | |
| 2009/0235246 A1* | 9/2009 | Seal | G06F 8/60 717/173 |
| 2010/0287539 A1 | 11/2010 | Park et al. | |
| 2011/0075704 A1* | 3/2011 | Bettendorff | H04B 1/713 375/133 |
| 2012/0084759 A1 | 4/2012 | Candea et al. | |
| 2013/0019228 A1* | 1/2013 | Bates | G06F 8/70 717/129 |
| 2013/0055217 A1* | 2/2013 | Boxall | G06F 11/3624 717/129 |
| 2014/0359375 A1* | 12/2014 | Longobardi | G06F 11/1471 714/45 |
| 2015/0332043 A1* | 11/2015 | Russello | G06F 11/30 726/23 |
| 2016/0110281 A1 | 4/2016 | Cheng | |
| 2016/0266997 A1* | 9/2016 | Kandpal | G06F 11/3636 |

OTHER PUBLICATIONS

PCT/US2017/028081, "International Search Report and Written Opinion", dated Jun. 30, 2017, 17 pages.

* cited by examiner

DEBUGGING CODE CONTROLLING RESOURCE-CONSTRAINED INTELLIGENT DEVICES CONTEMPORANEOUSLY WITH EXECUTING OBJECT CODE

TECHNICAL FIELD

This disclosure relates generally to computer software and more particularly relates to debugging code for controlling radio devices and other resource-constrained intelligent devices contemporaneously with (e.g., in real-time) executing object code on the intelligent device.

BACKGROUND

Devices such as radios, utility meters, and other electronic tools may include processing capabilities that allow the devices to be remotely controlled or configured. For example, an intelligent utility meter can execute commands such as transmitting collected data to a head-end server, loading configuration data that controls one or more operating parameters of the meter, modifying operations in response to external conditions (e.g., daylight savings time changeover, time of day, etc.). These processing capabilities can be provided using relatively simple programming languages that do not require complex operating systems.

These types of intelligent devices may have limited memory storage or other computing resources. For example, a given device may be unable to store program code larger than four or eight kilobytes. The limitations on memory storage or other computing may prevent at least some debugging features from being included in the program code that is used to operate the intelligent device.

The omission of debugging features from program code that is used to operate an intelligent device can present disadvantages. For example, a developer may be unable to accurately or efficiently identify which portion of program code is causing a malfunction or other issue in the operation of an intelligent device. An inability to accurately or efficiently identify portions of program code that cause malfunctions or other issues may increase the time and costs associated with developing program code to control intelligent devices. Furthermore, inability to accurately identify portions of program code that cause malfunctions or other issues may cause developers to make errors when attempting to correct these malfunctions or other issues in the program code, which can negatively impact the operation of the intelligent device.

It is desirable to provide improved debugging features for program code used to control intelligent devices with limited computing resources.

SUMMARY

Systems and methods are disclosed for debugging code used for controlling radio devices and other resource-constrained intelligent devices contemporaneously (e.g., in real-time) with executing object code on the intelligent device. In some embodiments, object code, which is generated from assembly code, is transmitted from a computer to a radio device. A program counter entry is provided from the radio device to the computer via a communication link. The transmission of the program counter entry indicates a pause in execution of the object code at the radio device. A correspondence between the received program counter entry and a portion of the assembly code is identified and is used to generate a list of additional program counter entries for pausing the object code execution. The list of additional program counter entries is provided from the computer to the radio device and used to pause execution of the object code at the radio device. Electronic log data is provided from the radio device to the computer for display after pausing the object code's execution at one of these program counter entries.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings.

DETAILED DESCRIPTION

Figure 1:
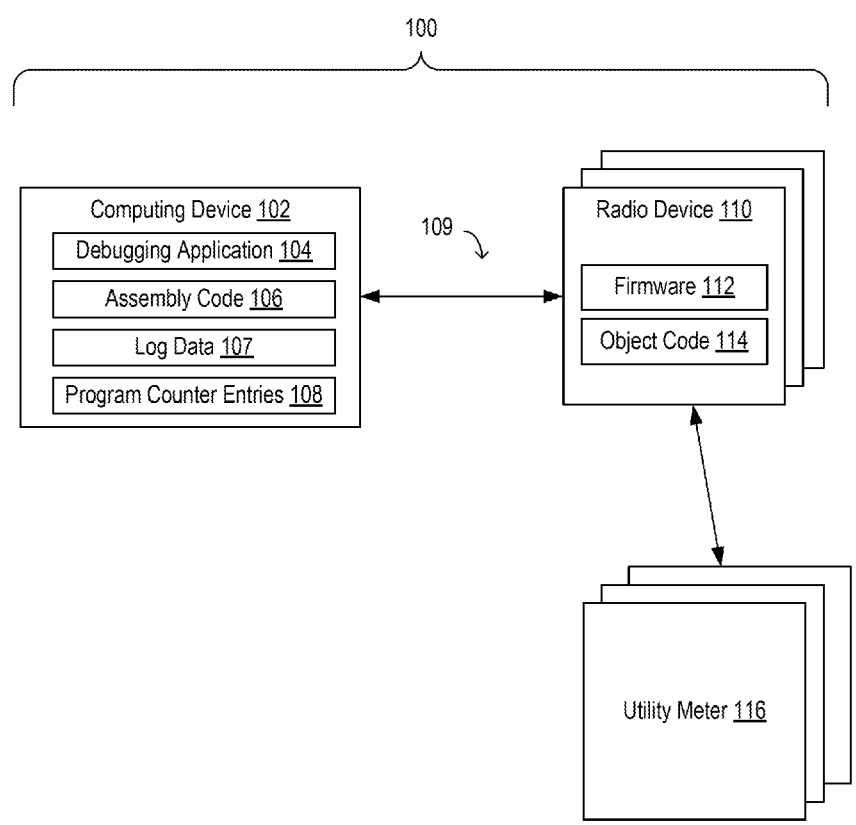
FIG. 1 is a block diagram illustrating an example of a system that can debug code for controlling radio devices and other resource-constrained intelligent devices contemporaneously with executing object code on the intelligent device.

Systems and methods are provided for debugging of assembly code (and, in some aspects, associated source code) contemporaneously with object code, which is generated from the assembly code, being executed on a radio device or other intelligent device. The assembly code is used to generate object code for a radio device, and the debugging can be performed without including breakpoints directly in the object code. Debugging assembly code and/or its associated source code without including breakpoints in the object code can improve the operation of radio devices (e.g., transceivers, utility meters, etc.) having processing resources that are insufficient for supporting complex debugging features.

The following example is used to introduce (without limitation) certain aspects of this disclosure. For example, a program for a transceiver or other radio device can be written in source code (e.g., C++ or another suitable programming language), which is then used to generate assembly code (e.g., a set of machine instructions) and its corresponding object code (e.g., a set of numerical opcodes corresponding to the machine instructions). In some aspects, the assembly code can be generated without using a higher-level source code. The radio device may have limited computing resources (e.g., memory, processing power, etc.), which may prevent the radio device from utilizing breakpoints or other resource-intensive debugging features.

A debugging application that is executed on a computing device separate from the radio device can provide these debugging features for the assembly code and/or its associated source code without including breakpoints in the object code itself. For example, the computing device can communicate byte-oriented communication data with a radio device. This byte-oriented communication data can include a program counter entry received by the debugging application from the radio device. The program counter entry can be either a value of an initialized program counter at the radio device (e.g., "P=0000") or a value of the program counter after execution of at least some of the object code (e.g., "P=01e4"). The debugging application can automatically identify a correspondence between certain program counter entries in the log data and certain portions of the assembly code (or its associated source code). The debugging application, which can perform a simulated execution of the object code, can use the identified correspondence to synchronize a simulated program counter for the simulated execution with the received program counter entry. Using the synchronized simulated program counter, the debugging application can determine additional program counter values for the object code execution that correspond to desired pauses in execution (e.g., breakpoints added to the assembly code after the object code was generated). The debugging application can provide at least some of the determined program counter values to the radio device. After the radio device resumes execution of the object code, firmware on the radio device can pause the execution in response to encountering one of the additional program counter values provided by the debugging application. In this manner, the execution of the object code can be paused for debugging, thereby simulating breakpoint behavior without requiring that breakpoints be included in the object code itself.

The paused execution of the object code can allow the debugging application to access electronic log data corresponding to a state of the radio device during the pause in execution. The electronic log data can include one or more program counter entries, as well as additional data. For example, a given log entry can include one or more of an opcode value (e.g., a numerical code) corresponding to a certain processor operation specified in the assembly code, a value stored in a flag register that indicates a state of a processor at the time of the operation, and/or values stored in one or more other registers that are generated by the processor performing the operation. The debugging application can display the register values and/or opcode values, thereby allowing for debugging of the object code.

As used herein, the tem "source code" is used to refer to high-level programming instructions that are written using human-readable plain text. Source code can include functions that are defined independently of specific computing architectures. The source code can be converted by a compiler application into assembly code that is specific to a given computing architecture. Examples of source code include C, C++, C#, Visual Basic, Java, Python, Perl, JavaScript, ActionScript, etc.

As used herein, the tem "assembly code" is used to refer to a low-level programming language for a computing device that provides a strong correspondence (e.g., a one-to-one correspondence) between commands of the assembly code and instructions that are executable by the computing device.

As used herein, the tem "object code" is used to refer to a set of instructions including commands that are directly executable by the computing device. The instructions in object code can be specified using a machine code language (e.g., binary code). For example, object code can include a file that includes a set of opcodes for a computing device that are specified in hexadecimal notation.

As used herein, the term "opcode" is used to refer to a numerical representation (e.g., a binary number written in hexadecimal notation) corresponding to an instruction from assembly code.

As used herein, the term "program counter" is used to refer to a register (e.g., a rapid-access, bit-level memory storage location) used by a processing device to store an address (e.g., a pointer value) of an instruction that is being executed by the processing device or the next instruction to be executed by the processing device. An example of a program counter is a latch that can be incremented and/or reset to zero in response to commands.

As used herein, the term "flag register" is used to refer to a register used by a processing device to store a set of bits that indicate a current state of the processing device.

As used herein, the term "byte-oriented communication data" is used to refer to data that is transmitted using a communication protocol that uses full bytes (i.e., eight bits) to represent control codes defined by the communication protocol. Such a protocol may use an entire byte to communicate a command signal to a receiving device, with control characters included in the header and trailer of each data byte.

In some aspects, the techniques described herein allow for real-time debugging of programming commands, such as device control words and other object code, executed by a radio device or other intelligent device. For example, using a debugging program to provide a list of program counter values to a radio or other intelligent device can allow the execution of object code on the radio device to be paused at any suitable point of time for debugging. Subsequent commands provided by the debugging application to the radio or other intelligent device can allow the paused execution to resume for debugging purposes (e.g., stepping through the execution on the radio in a line-by-line manner).

In additional or alternative aspects, pausing the execution of the object code on the radio or other intelligent device allows additional functions to be performed that may not be available without the pausing techniques described herein. In one example, the debugging application can be used to alter one or more register values in the radio device prior to a resumption of the object code's execution. In another example, the debugging application can be used to view, modify, or otherwise use virtual memory information for one or more operations performed by the radio device that executes the object code. In another example, user-defined watches for the object code's execution can be modified or otherwise used for one or more operations performed by the radio device that executes the object code. In another example, the debugging application can be used to view the contents of an output buffer for one or more operations performed by the radio device that executes the object code.

In some aspects, the techniques described herein can allow breakpoints or other complex debugging features to be omitted from the object code executed at a radio device or other intelligent device. Omitting breakpoints or other complex debugging features from the object code can allow for more effective debugging of assembly code and/or its associated source code used to control radio devices with limited computing resources. For example, an intelligent device that executes object code may have limited memory, processing power, or other computing resources due to being a radio or other transceiver device with a limited amount of available memory storage (e.g., four or eight kilobytes). This limitation may prevent the radio device from utilizing breakpoints or other resource-intensive debugging features. The memory storage may be sufficient to store relatively simple commands specified in the object code, but may be insufficient to handle more complex debugging features (e.g., configuring the transceiver device to pause all operations in response to a breakpoint). Thus, it may be impracticable or infeasible to include breakpoints or similar debugging features in the object code provided to the radio device. But identifying program counter entries at which execution of the object code should be paused can allow the firmware of the radio device to pause execution of the object code at suitable points, which allows developers to identify errors or other issues in the corresponding assembly code and/or its associated source code even if the radio device itself cannot support complex debugging features.

In additional or alternative aspects, the debugging techniques described herein can allow the assembly code and/or its associated source code to be debugged more effectively than would be achieved by emulating the behavior of a radio device or other intelligent device in software. For example, even if a computing device having sufficient computing resources to support complex debugging features is used to execute the object code, the operation of the radio device may be sufficiently complex that the computing device cannot accurately emulate the behavior of the intelligent device in a deployment environment. For example, an intelligent device may be a radio that is deployed in a mesh network. The radio may perform different operations in response to various conditions in the mesh network (e.g., quality of communication links, number of nodes in the mesh network, etc.). The number of different conditions or combinations thereof that affect the operations performed by the radio may be too large to emulate in software. Additionally or alternatively, it may be infeasible to identify the effects of certain conditions that affect the operations performed by the radio or to model the effects of those conditions in software. But pausing execution of the object code on the radio in a real-world deployment environment and utilizing log data generated by execution of the object code can allow the execution of the object code to be accurately evaluated in a manner that allows developers to identify errors or other issues in the assembly code and/or its associated source code resulting from operation of the radio device in the deployment environment.

These illustrative examples are given to introduce the reader to the general subject matter discussed here and are not intended to limit the scope of the disclosed concepts. The following sections describe various additional aspects and examples with reference to the drawings in which like numerals indicate like elements.

Referring now to the drawings, FIG. 1 is a block diagram illustrating an example of a system that can use log data generated from the execution of object code by a radio device to debug code used to control the radio device. The system 100 depicted in FIG. 1 includes one or more computing devices 102 and one or more radio devices 110. (Although this disclosure describes radio devices for illustrative purposes, other intelligent devices can also be used with the techniques included in this disclosure.)

The computing device 102 can include one or more processing devices that execute a debugging application 104. The debugging application 104 can debug assembly code 106 that is used to control a radio device. The assembly code 106 can be debugged using log data 107 that is generated in response to the radio device 110 executing object code 114. The object code 114 is generated from the assembly code 106. The debugging can involve using a list of program counter entries 108 to cause a radio device 110 to pause execution of object code 114. These pauses in execution can allow a developer to observe one or more states of the radio device 110 and debug the corresponding assembly code 106.

The computing device 102 can include any device or group of devices that can execute the debugging application 104. The debugging application 104, assembly code 106, and log data 107 can be stored in one or more non-transitory computer-readable media that are included in, or accessible to, the computing device 102. Examples of a computing device 102 include a laptop, a tablet computer, a server system, etc.

The radio device 110 can be included in or communicatively coupled to any device or group of devices configured to perform one or more end-user functions. For example, the radio devices 110 depicted in FIG. 1 can be included in or communicatively coupled to utility meters 116 or other metering devices that monitor consumption of power or other resources by a building or structure. Each radio device 110 can include a transceiver device that transmits and receives signals.

Each radio device 110 can also include one or more processing devices that are configured by firmware 112 to perform operations. The firmware 112 can be stored on a non-transitory computer-readable medium of the radio device 110. For example, the firmware 112 can include instructions that are embedded on the radio device 110 (e.g., via storage to a read-only memory). The firmware 112 can include one or more executable instructions that are used for controlling one or more hardware components of the radio device 110. The firmware 112 can communicate directly with a hardware component of the radio device 110 without requiring interaction with a high-level operating system.

The radio device 110 can also access and execute the object code 114 to perform one or more operations in addition to those operations specified in the firmware 112. The object code 114 can include a set of opcodes that are directly executable by a processing device of the radio device. The opcodes can be used to provide customized operations of the radio device 110 without changing the firmware 112. For example, the object code 114 can be used to customize features of the radio device 110, such as the transmission or reception frequencies used by the radio device 110 or other modifiable configuration settings for the radio device 110.

FIG. 1 depicts the firmware 112 and the object code 114 as separate modules for illustrative purposes. However, other implementations are possible. For example, the object code 114 may be a program module within the firmware 112.

One or more of the firmware 112 and the object code 114 can include functions for logging events generated by the operation of the radio device 110. For example, an operation of a processing device of the radio device 110 can be associated with a certain state. An example of a state of the processing device can include an arithmetic or logical function being performed by the processing device, register values associated with the function, etc. Executing one or more of the firmware 112 and the object code 114 can configure the radio device 110 to generate or update log data 107. The log data 107 can include data describing different states of one or more components of the radio device 110 during execution of the object code 114. Examples of this data include program counter values, register values, etc.

The computing device 102 can communicate with the radio device 110 via one or more suitable communication links 109. The communication link 109 depicted in FIG. 1 can represent links established via one or more interfaces. In some aspects, the communication link 109 can include a wired connection between the computing device 102 and the radio device 110. For example, one or both of the computing device 102 and the radio device 110 can include a serial communication interface (e.g., an RS-232 serial port, an RS-232/486 serial port, etc.). The communication link 109 can be established by connecting a suitable communication cable to each of the serial communication interfaces. The communication link 109 can be used to communicate byte-oriented communication data between the computing device 102 and the radio device 110. Examples of such communication data include updates to the firmware 112, updates to the object code 114, updates to other programming code used by the radio device 110, log data 107, etc. In additional or alternative aspects, the communication link 109 can include wireless communication between the computing device 102 and the radio device 110. For example, the computing device 102 and the radio device 110 may include wireless RF transceivers used to communicate with one another. In additional or alternative aspects, the communication link 109 can include multiple communication links that involve both wireless communication and wired connections. For example, relatively small files (e.g., object code 114) can be transmitted via a wireless communication link, and larger files (e.g., log data 107) can be transmitted via a wired, serial connection.

Figure 2:
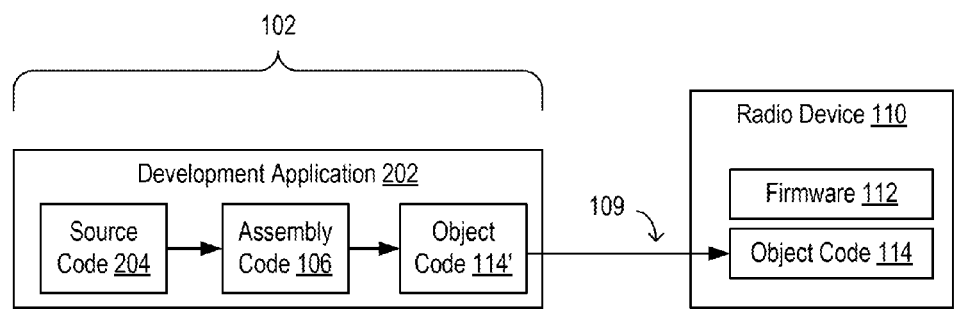
FIG. 2 is a block diagram illustrating an example of the computing device of FIG. 1 generating the object code from the assembly code and associated source code.

The object code 114 can include machine-readable instructions that are generated using the assembly code 106. FIG. 2 is a block diagram illustrating an example of the computing device 102 generating the object code 114 using the assembly code 106.

The assembly code 106 can be created, modified, or otherwise used by a development application 202. The development application 202 can provide one or more features for developing computer-executable program code, such as, for example, a source code editor, a compiler, an assembler, etc. The computing device 102 can use the development application 202 to generate object code and can provide the generated object code to the radio device 110. For illustrative purposes, FIG. 2 depicts a copy of the object code 114' that is generated on the computing device 102 and a copy of the object code 114 that is stored on the radio device 110. The object code 114 and object code 114' depicted in FIG. 2 have the same content.

In some aspects, the development application 202 can be used to create, modify, or otherwise access source code 204 in a high-level programming language. The development application 202 can execute one or more compiler modules and thereby compile the source code 204 into assembly code 106. The assembly code 106 can include instructions that are specific to a radio device 110 and that implement the functions specified by the source code 204. For example, compiling the source code 204 into the assembly code 106 can include converting the high-level programming functions specified in the source code 204 into executable instructions that are selected from a set of operations that can be performed by a specific radio device 110.

In additional or alternative aspects, the development application 202 can be used to create, modify, or otherwise access assembly code 106 without using source code in a high-level programming language. For example, the development application 202 can include one or more features that a developer may use to directly draft and revise assembly code 106 that includes instructions that are specific to a radio device 110 without requiring the use of a compiler module to compile source code into the assembly code 106.

The development application 202 can execute one or more assembler modules and thereby assemble the assembly code 106 into the object code 114'. The object code 114 can include one or more opcodes that are executable by the radio device 110. The opcodes can be numeral representations of corresponding instructions from the assembly code 106. These numerical representations can control the processing circuitry of the radio device 110.

The computing device 102 can provide the object code 114' to the radio device 110 via a communication link 109. The radio device 110 can store the received object code 114' in a non-transitory computer-readable medium as the object code 114.

In some aspects, the development application 202 can be executed on the same computing device 102 that executes the debugging application 104. In other aspects, the development application 202 can be executed on a computing device that is separate from the computing device 102 that executes the debugging application 104. In some aspects, the debugging application 104 can be a module of the development application 202. In other aspects, the debugging application 104 can be an application that is executable separately from the development application 202.

The debugging application 104 can generate the list of program counter entries 108 by identifying a program counter value at the radio device 110, synchronizing a simulated program counter at the computing device 102 with the program counter at the radio device, and selecting the list of program counter entries 108 from simulated program counter values. For example, the debugging application 104 can simulate, at the computing device 102, the execution of the object code 114. The simulation can involve generating simulated program counter entries, which correspond to different portions of the assembly code 106. If the simulated program counter at the computing device 102 is synchronized with the actual program counter at the radio device 110, the simulated program counter entries, which correspond to certain portions of the assembly code 106, can reflect values that the actual program counter will have when certain portions of the object code 114 are executed at the radio device 110.

To pause execution of the object code 114 on the radio device 110 at specified points, the firmware 112 can be provided with the list of program counter entries 108. The firmware 112 can also be instructed to pause the execution of the object code 114 if the program counter at the radio device 110 has a value that matches one of the program counter entries 108. In this manner, the execution of the object code 114 can be paused in a manner similar to using a breakpoint without actually including breakpoints in the object code 114.

Figure 3:
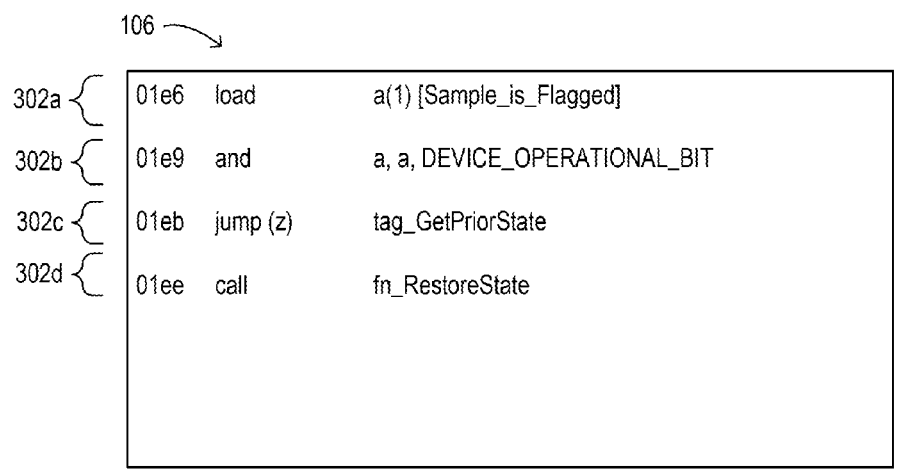
FIG. 3 depicts an example of assembly code of FIGS. 1 and 2 that can be debugged contemporaneously with a radio device that executes object code generated from the assembly code.

FIG. 3 depicts an example of assembly code 106 that can be debugged using these techniques. (For illustrative purposes, FIG. 3 depicts pseudocode rather than functional source code for performing specific functions of a radio device). The assembly code 106 includes assembly code portions 302a-d. Each of the assembly code portions 302a-d can be used to specify operations to be performed by the radio device 110, which performs a given algorithm that includes these operations.

Figure 4:
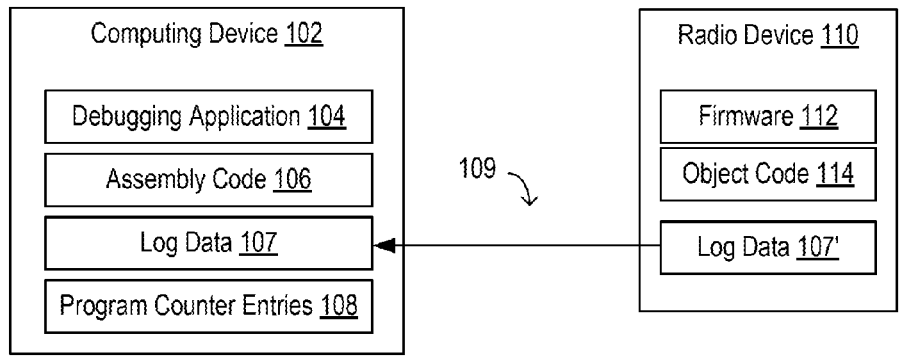
FIG. 4 is a block diagram illustrating an example of the computing device of FIG. 1 obtaining log data from the radio device that executes the object code.

In some aspects, the debugging application 104 can use log data 107, which is generated by the execution of the object code 114 at the radio device 110, to synchronize a simulated program counter at the computing device 102 with an actual program counter at the radio device 110. For example, FIG. 4 is a block diagram illustrating an example of the computing device 102 obtaining the log data 107 from the radio device 110. The radio device 110 can execute the instructions included in the object code 114 to perform one or more operations (e.g., monitoring power usage, communicating with other devices, etc.). As the firmware 112 executes the object code 114, the values stored in different registers used by a processing device of the radio device 110 can change.

For example, each operation performed by the processing device can include a different combination of values for a program counter, a flag register, an accumulator, and/or other registers used by the processing device. For each operation, the radio device 110 can generate an entry in the log data 107' that includes the combination of register values representing the state of the radio device 110. The log data 107' can be downloaded by the computing device 102 from the radio device 110 via the communication link 109 and can be stored as log data 107 in a suitable non-transitory computer-readable medium that is accessible to a processing device of the computing device 102.

For illustrative purposes, FIG. 4 depicts a copy of the log data 107 that is stored on the computing device 102 and a copy of the log data 107' that is stored on the radio device 110. In some aspects, the log data 107 can be the same as the log data 107'. For example, the computing device 102 can be communicatively coupled to the radio device 110 while the radio device 110 executes the object code 114. The log data 107' can be transmitted to the computing device 102 nearly simultaneously with its generation such that the log data 107 is identical to the log data 107'.

Figure 5:
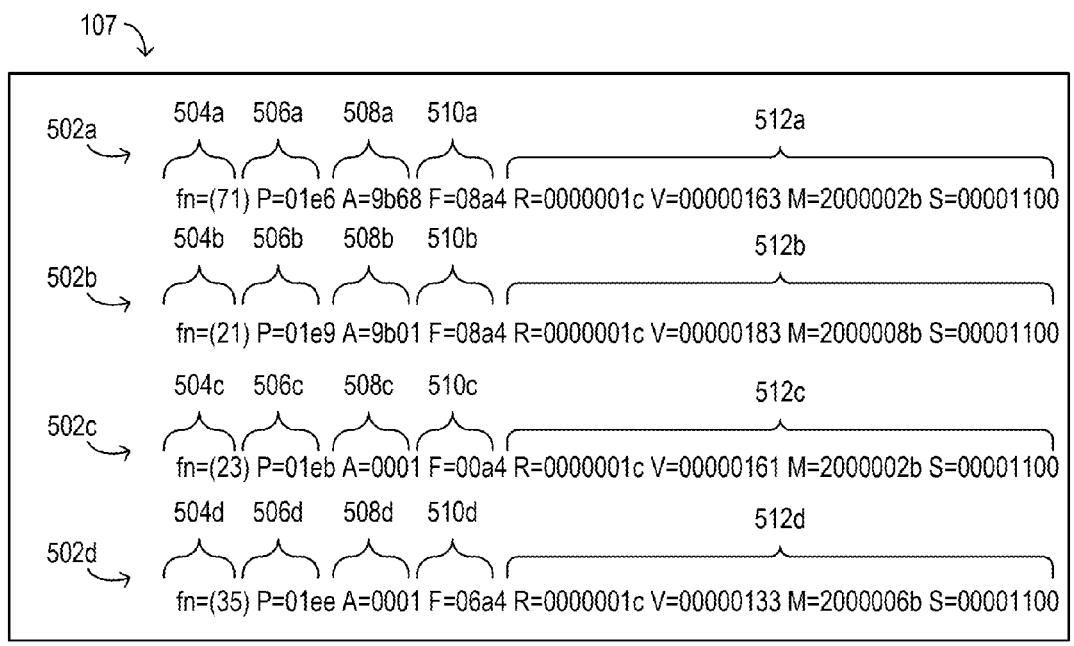
FIG. 5 depicts an example of log data generated by executing object code.

FIG. 5 depicts an example of log data 107 that is generated by executing the object code 114. The log data 107 includes one or more entries 502a-d. Each of the entries 502a-d corresponds to a state of a processing device of the radio device 110 as the object code 114 was executed by the processing device. For example, the entries 502a-d respectively include opcode values 504a-d, program counter values 506a-d, accumulator register values 508a-d, flag register values 510a-d, and other register values 512a-d. Each of the opcode values 504a-d identifies a respective opcode for a command executed by the processing device of the radio device 110. Each of the program counter values 506a-d can identify an address of a current instruction or subsequent instruction that is being executed by the processing device of the radio device 110. Each of the accumulator register values 508a-d is an intermediate value generated by a logical or arithmetic operation performed by the processing device of the radio device 110. Each of the flag register values 510a-d is a value indicating a current state of the processing device of the radio device 110. Each of the other register values 512a-d can include other values used by the processing device of the radio device 110 to perform one or more operations (e.g., interim values from arithmetic operations, etc.). Each combination of values in a respective one of the entries 502a-d can represent a state of a processing device of the radio device 110 at a given point in time during execution of the object code 114.

Figure 6:
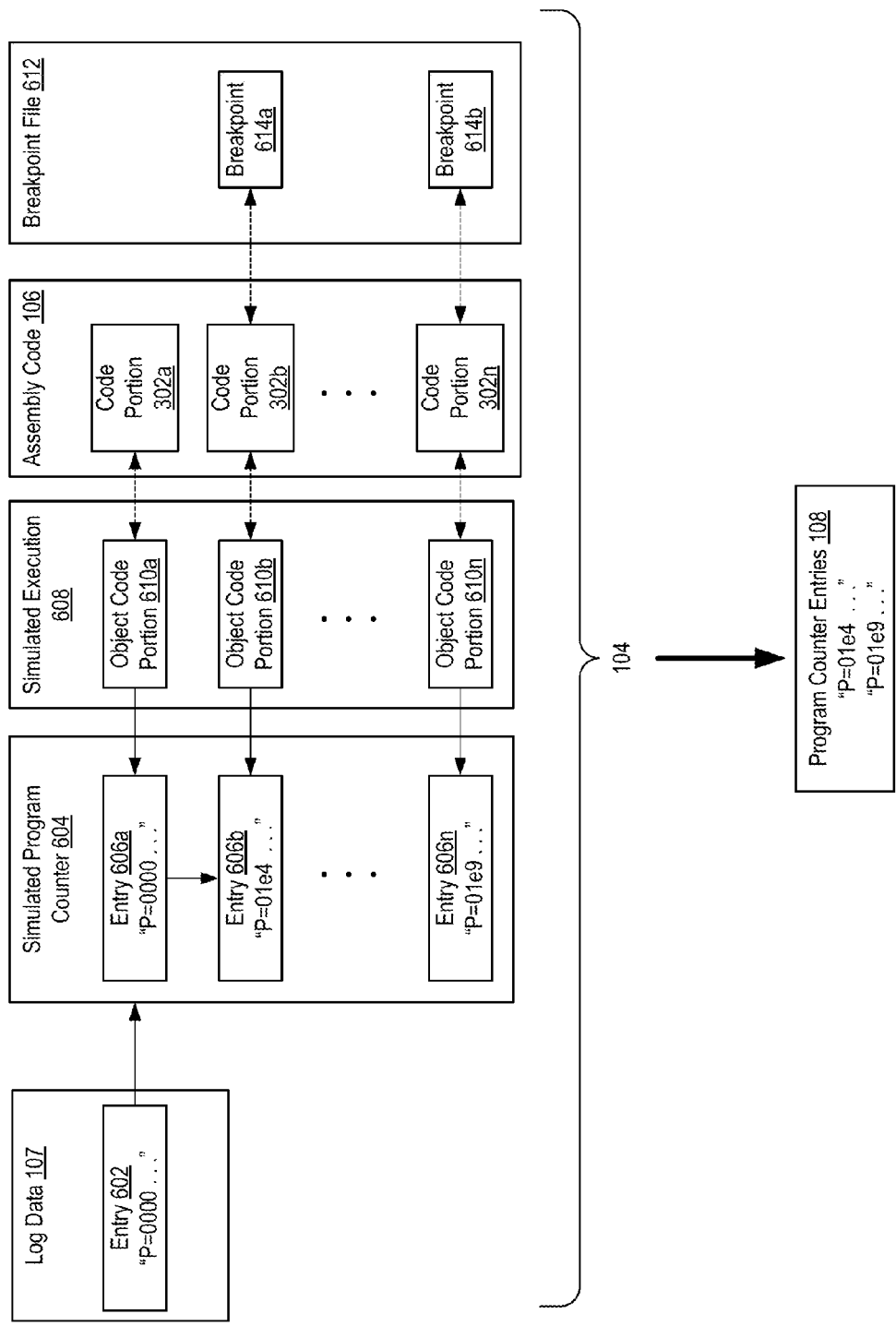
FIG. 6 is a block diagram illustrating an example of a debugging application of FIG. 1 using a synchronized simulated program counter to generate program counter entries for pausing execution of object code on a radio device or other resource-constrained intelligent device.

An entry of the log data 107 can be used to synchronize a simulated program counter at the computing device 102 with an actual program counter at the radio unit. For instance, FIG. 6 is a block diagram illustrating an example of the debugging application 104 using a synchronized simulated program counter 604 to generate the program counter entries 108, which are used by the firmware 112 for pausing execution of the object code 114 on the radio device 110. The simulated program counter 604 can be used with a simulated execution 608 of the object code 114 at the computing device 102.

In this example, the debugging application 104 can receive a program counter entry 602 from the radio device 110. To enable debugging of the object code 114 under test, the debugging application 104 or other suitable application can generate object code 114 from the assembly code 106 (e.g., by compiling the source code 204 as described above with respect to FIG. 2). The object code 114, which may be a compiled hex file, can be loaded into the radio device 110 via a suitable port (e.g., a "debug" port on the radio). A "debug" instruction can be provided to the firmware 112 of the radio device 110.

In some aspects, as depicted in the example of FIG. 6, the firmware 112 can be configured with an option to initialize a program counter at the radio device 110 as part of the debugging operation. For example, the program counter at the radio device 110 can be set to "0x0000." The firmware 112 can execute an initial operation specified by the object code 114 (e.g., a first opcode), pause the execution of the object code after performing the initial operation and before executing another operation (e.g., a second opcode immediately following the first opcode), and provide certain log data 107 to the computing device 102 via the communication link 109.

In the example depicted in FIG. 6, this log data 107 includes a program counter entry 602 that reflects the initialized program counter value at the radio device 110. For instance, the program counter entry 602 can have the value "P=0000" in the log data entry "fn=(ec) P=0000 A=0000 F=0004 R=00000000 V=00000100 M=00000000 S=00001100."

The debugging application 104 can use the program counter entry 602 to generate additional program counter entries 108. In this example, the debugging application 104 initializes the simulated program counter 604 based on the program counter entry 602 having the value "P=0000." The simulated execution 608, which can be performed at the computing device 102 or another computing device external to the radio device 110, can include executing the object code portions 610*a-n* and generating corresponding simulated program counter entries 606*a-n* in the simulated program counter 604.

The object code portions 610*a-n* included in the simulated execution 608 can correspond to respective assembly code portions 302*a-n* and to respective simulated program counter entries 606*a-n*. The simulated program counter entries 606*a-n* indicate the program counter values that will be present on the radio device 110 due to execution of the object code 114 on the radio device 110. Thus, a given one of the assembly code portions 302*a-n* can be mapped to a program counter value that will occur on the radio device 110 during execution of the object code 114 on the radio device 110.

In additional or alternative aspects in which the source code 204 is used to generate the assembly code 106, the debugging application 104 can determine that the identified instruction in the assembly code 106 is generated from a given portion of the source code 204. This determination can be performed in any suitable manner. For example, the debugging application 104 can access additional log data generated by a compiler of the development application 202 that compiled the source code 204 into the assembly code 106. This log data from the compilation process can be used by the debugging application 104 to identify which portion of the source code 204 was used to generate an instruction in the assembly code 106 having a given program counter value that matches a given entry from the log data 107.

A correspondence between simulated program counter entries and assembly code portions can be used to simulate breakpoint functionality in the object code 114 without requiring breakpoints to be inserted in the object code 114. For example, the debugging application 104 can use a breakpoint file 612 to associate one or more of the assembly code portions 302*a-d* with one or more breakpoint indicators 614*a*, 614*b*. A given one of the breakpoint indicators 614*a*, 614*b* can be associated with a given one of the assembly code portions 302*a-n*.

The associations between breakpoint indicators 614*a*, 614*b* and respective assembly code portions can be stored in any suitable manner, such as (but not limited to) a database that includes breakpoint file 612 and or other data files. For example, a file that includes the assembly code 106 can include metadata that identifies different assembly code portions 302*a-d*. Identifiers in the metadata can be used to indicate that a given portion of the assembly code and/or its associated source code is located in the file at a given location. The location can be specified in any suitable manner (e.g., a pair of line numbers in the file identifying the start and end of a given code portion, a set of memory blocks from the file that include the given code portion, etc.). A given breakpoint indicator can be associated with an identifier of an assembly code portion (and/or its associated source code portion) from the metadata of the file that includes the assembly code 106.

To simulate breakpoint functionality in the object code 114, the debugging application can select the program counter entries using the breakpoint file 612 and a mapping between assembly code portions 302*a-n* and simulated program counter values. In the example depicted in FIG. 6, the debugging application 104 determines that the breakpoint file 612 includes breakpoint indicators 614*a*, 614*b* for respective assembly code portions 302*b*, 302*n*. The debugging application 104 identifies the object code portions 610*b*, 610*n* that correspond to the assembly code portions 302*b*, 302*n* associated with the breakpoint indicators 614*a*, 614*b*. The debugging application 104 also identifies the simulated program counter entries 606*b*, 606*n* that correspond to the respective object code portions 610*b*, 610*n*, which can in turn be mapped to the breakpoint indicators 614*a*, 614*b*.

Based on identifying the simulated program counter entries 606*b*, 606*n*, the debugging application outputs the program counter entries 108 that include the program counter values in the simulated program counter entries 606*b*, 606*n*. The debugging application 104 can provide the list of program counter entries 108 to the firmware 112. The debugging application 104 can also provide an instruction to the firmware 112 to pause execution of the object code 114 if the firmware 112 determines that a program counter in the radio device 110 has a value matching one of the program counter entries 108.

Figure 7:
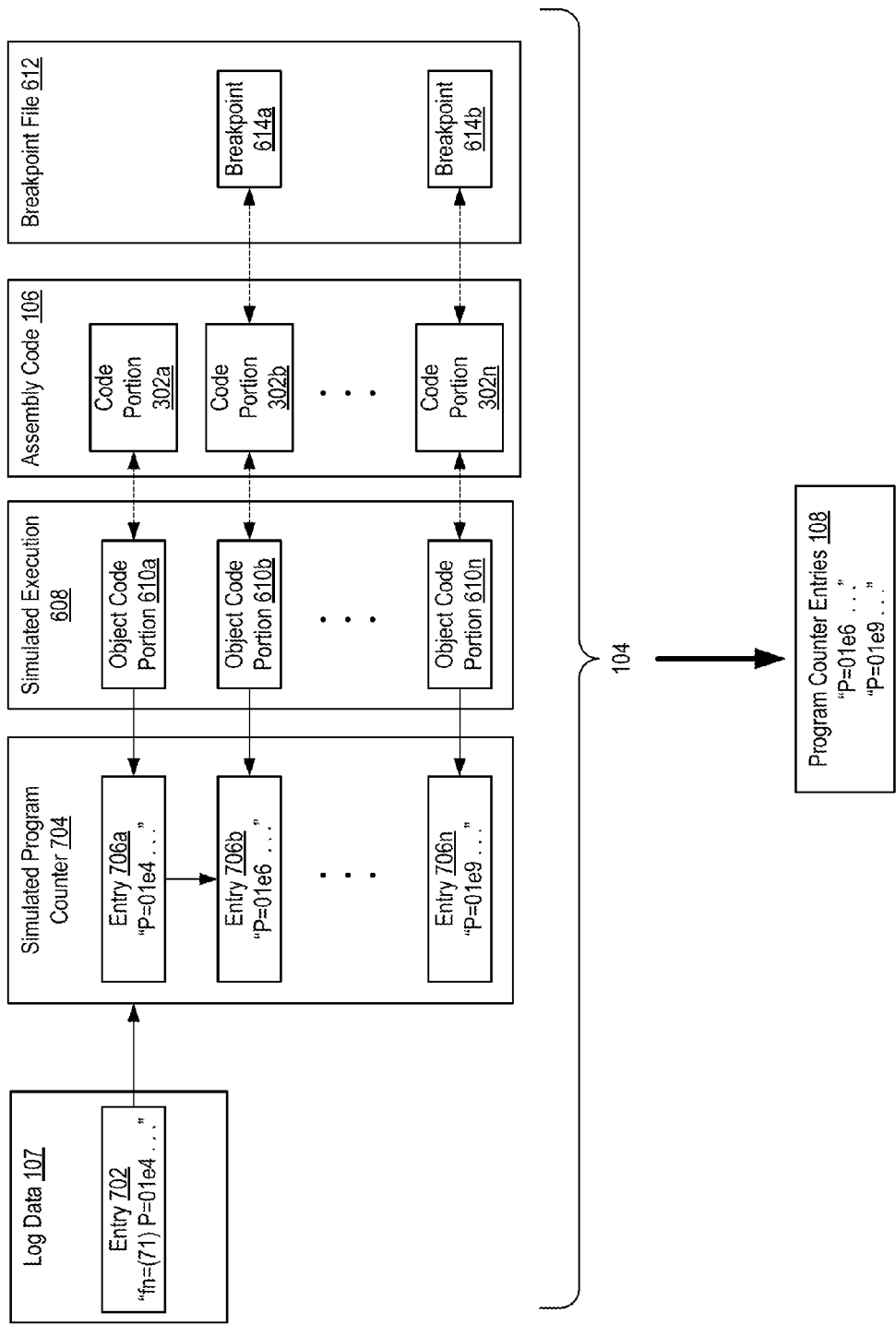
FIG. 7 is a block diagram illustrating another example of the debugging application of FIG. 1 using a synchronized simulated program counter to generate program counter entries for pausing execution of the object code a radio device or other resource-constrained intelligent device.

Although the example in FIG. 6 depicts the use of an initialized program counter value, other implementations are possible. For instance, FIG. 7 is a block diagram illustrating an example of the debugging application 104 using a synchronized simulated program counter 704, without requiring initialization of the program counter on the radio device 110, to generate the program counter entries 108 for pausing execution of the object code 114 on the radio device 110. The simulated program counter 704 can be used with a simulated execution 608 of the object code 114 at the computing device 102.

In this example, the debugging application 104 can receive a program counter entry 702 from the radio device 110. To receive the program counter entry 702, the debugging application 104 can instruct or otherwise cause the firmware 112 to pause an execution of the object code 114. The firmware 112 can pause the execution of the object code 114. In some aspects, the pause may not occur after performing an initial operation of the object code 114 (e.g., a first opcode). The firmware 112 can cause the radio device 110 to provide certain log data 107 to the computing device 102 via the communication link 109. In the example depicted in FIG. 7, this log data 107 includes a program counter entry 702 that reflects the program counter value at the radio device 110 at the time of the paused execution. For instance, the program counter entry 702 can have the value "P=01e4" in the log data entry "fn=(71) P=01e4 A=9b58 F=08a4 R=0000001c V=00000153 M=2000002b S=00001100."

The debugging application 104 can use the program counter entry 702 to generate the program counter entries 108. In this example, the debugging application 104 sets the simulated program counter 704 to a value corresponding to the program counter value based on the program counter entry 702 having the value "P=01e4." In some aspects, the debugging application 104 can use opcode value to generate, identify, or otherwise determine an association between one of the assembly code portions 302*a-d* and the program counter entry 702. For example, the debugging application 104 can search for values between "fn=" and "P=" to identify a given opcode value. The debugging application 104 can automatically search the assembly code 106 to identify a matching opcode value for an instruction in the assembly code 106. For example, the opcode value can be included in an assembler listing file that is generated when assembling the assembly code 106 into the object code 114 and that includes data matching opcodes to assembly code portions.

The simulated program counter entries 706a-n can therefore be generated by a simulated execution 608 of the object code portions 610a-n. The simulated program counter entries 706a-n can indicate subsequent program counter entries that will be present at the radio device 110 after execution of the object code 114. Thus, the debugging application can use the simulated program counter entries 706a-n and the breakpoint file 612 to generate the list of program counter entries 108 in a manner similar to what is described above for FIG. 6.

Figure 8:
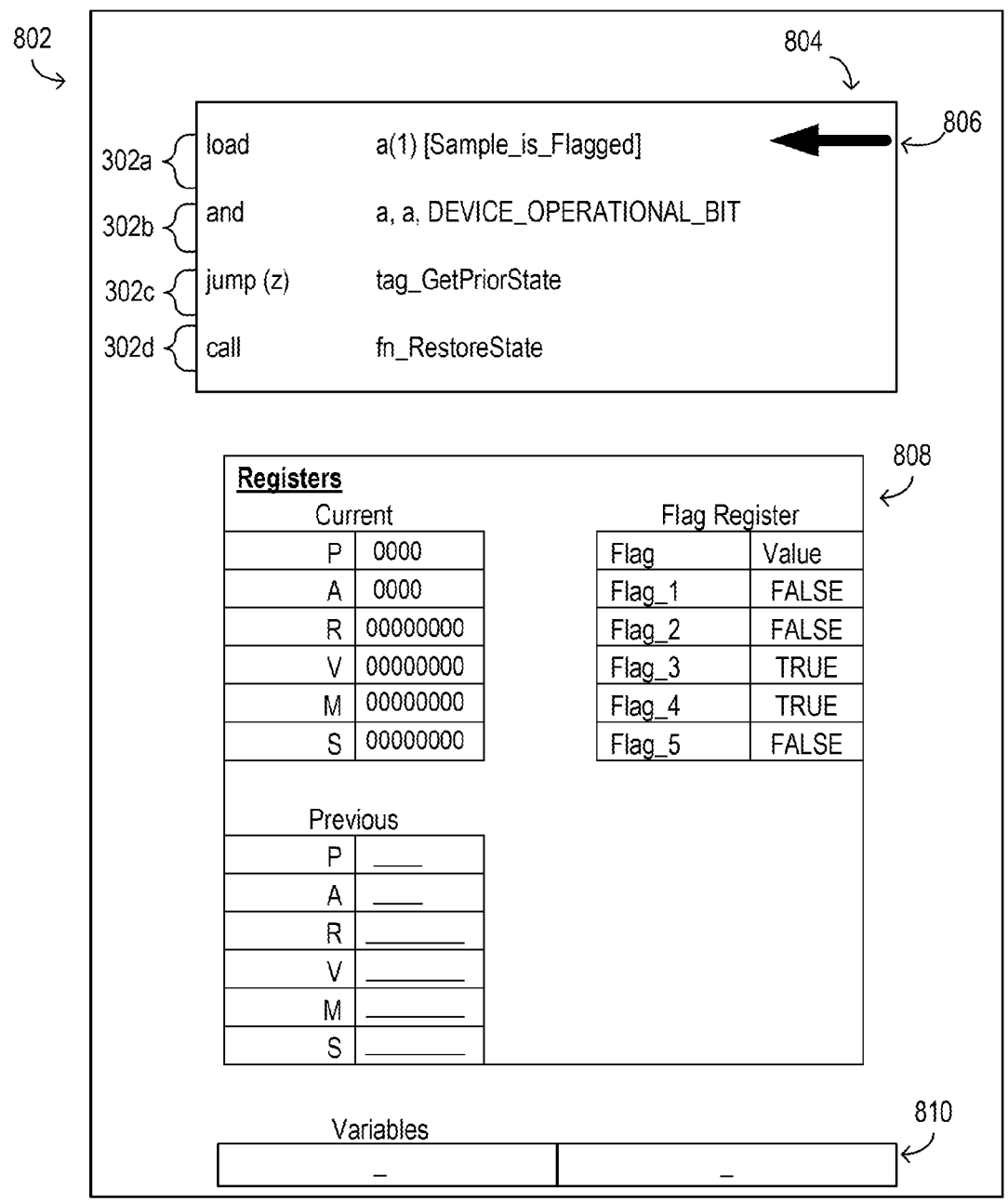
FIG. 8 is a diagram depicting an example of interfaces used to display log data and associated assembly code for debugging assembly code from which object code is generated.
Figure 9:
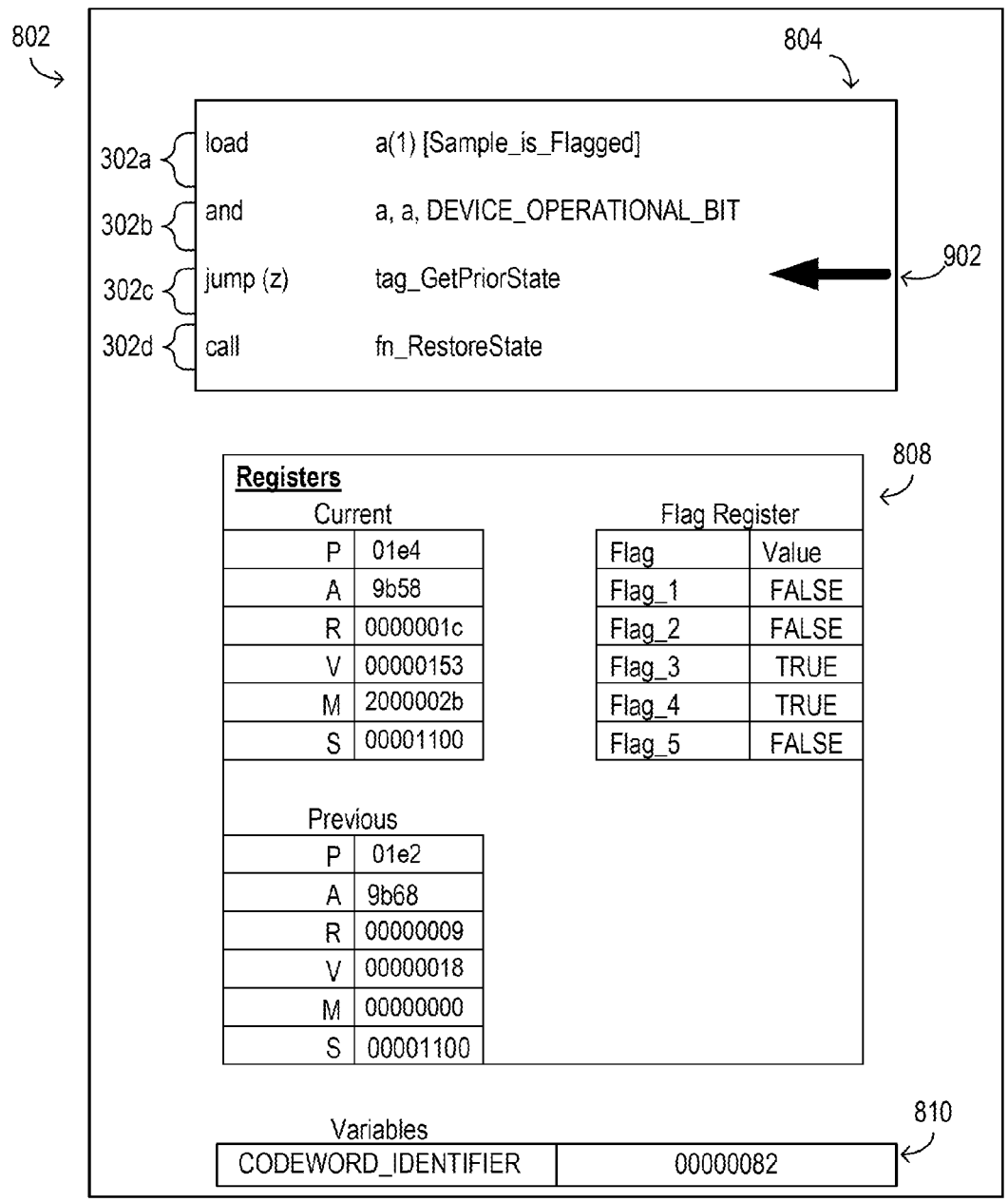
FIG. 9 is a diagram depicting an example of an updated interface from FIG. 8.

In some aspects, the debugging application 104 can generate, update, or otherwise use an interface that visually depicts the mapping between a program counter entry received from the radio device 110 and an assembly code portion or its associated source code portion. For instance, FIGS. 8 and 9 are diagrams depicting an example of an interface 802 used to display indicators of log data 107 and associated assembly code 106 corresponding to an execution of object code 114. The interface 802 depicted in FIGS. 8 and 9 includes regions 804, 808, 810.

The region 804 is used to depict at least some of the assembly code 106 or source code used to generate the assembly code 106. For example, as depicted in FIGS. 8 and 9, assembly code portions 302a-d are displayed in the region 804. In FIG. 8, a visual indicator 806 is used to identify an assembly code portion corresponding to a program counter entry received from the radio device 110 in a debugging operation. Although FIGS. 8 and 9 depicts the visual indicator as a bold arrow, any suitable visual indicia (e.g., highlighting, bold text, colored text, etc.) can be used to identify an assembly code portion of interest. In the example depicted in FIG. 8, an assembly code portion 302a, which may correspond to the initialized program counter value depicted in FIG. 6, is identified by the visual indicator 806. In the example depicted in FIG. 9, an assembly code portion 302c, which may correspond to the later program counter value depicted in FIG. 7, is identified by the visual indicator 902.

The region 808 can be used to display one or more register values obtained from the radio device 110 for one or more executed object code portions. For example, in FIG. 9, the region 808 depicts register values obtained from the log data and corresponding to the assembly code portion 302b (i.e., the "current" instruction identified by the visual indicator 806). The current register values are obtained from log data 107 and include a program counter value (i.e., "01e4"), an accumulator register value (i.e., "9b58"), and additional register values 512b (i.e., "0000001c," "00000153," "2000002b," and "00001100"). The region 808 also includes a set of flag register codes obtained from a flag register value in the log data 107. The region 808 depicted in FIG. 8 also displays at least some previous register values corresponding to the assembly code portion 302a whose execution was simulated prior to the assembly code portion 302b. The previous register values include a program counter value (i.e., "01e2"), an accumulator register value (i.e., "9b68"), and additional register values (i.e., "00000009, "00000018, "00000000," and "00001100").

The region 810 is used to identify one or more variables from the current instruction and their corresponding values. For example, as depicted in FIG. 9, the debugging application 104 can determine that a current assembly code portion 302c being debugged includes the variable "CODEWORD_IDENTIFIER." The debugging application 104 determines the value of the "CODEWORD_IDENTIFIER" variable from the assembly code 106 and displays the value in the region 810.

Figure 10:
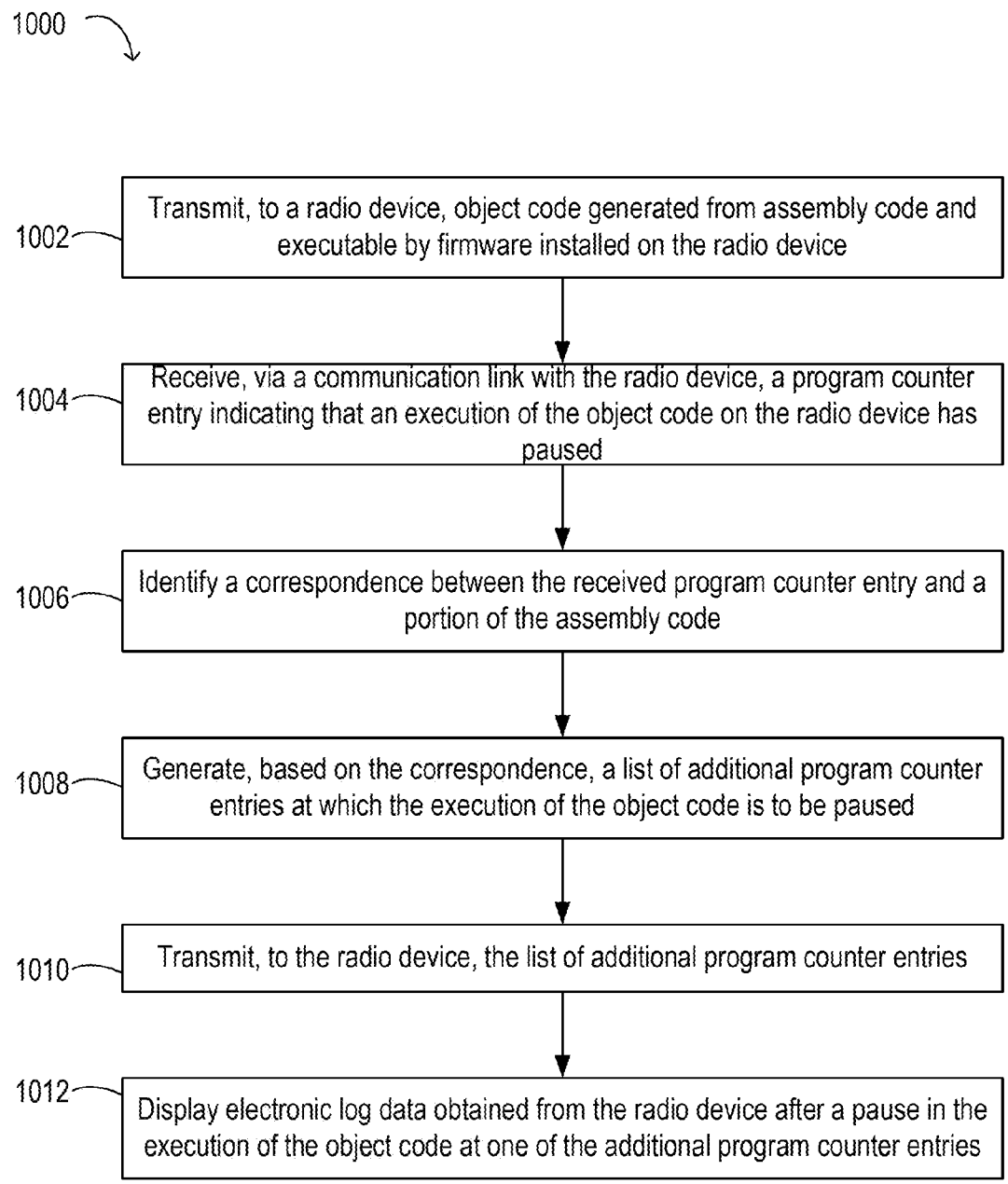
FIG. 10 is a flow chart depicting an example of a method for using a computer-implemented debugging application to debug code for controlling a radio device or other resource-constrained intelligent device contemporaneously with executing, on the intelligent device, object code that is generated from the debugged code.

FIG. 10 is a flow chart depicting an example of a method 1000 for using a computer-implemented debugging application 104 to debug code that controls a radio device 110 or other resource-constrained intelligent device contemporaneously with executing, on the intelligent device, object code 114 that is generated from the debugged code. For illustrative purposes, the method 1000 is described with reference to the implementation depicted in FIGS. 1-9. Other implementations, however, are possible.

The method 1000 involves transmitting, to a radio device 110, object code 114 generated from assembly code 106 and executable by firmware 112 installed on the radio device 110, as shown in block 1002. For example, one or more suitable processing devices can execute program code that includes the development application 202. Executing the development application 202 can configure the processing device to perform one or more operations. In some aspects, the operations can include generating the assembly code 106. The assembly code 106 can include a set of instructions that are specific to a processing device of the radio device 110 and program counter values that correspond to respective instructions. The operations can also include assembling the assembly code 106 into the object code 114, as described above with respect to FIG. 2. The object code 114 can include opcodes that are executable by the processing device of the radio device 110. In some aspects in which source code 204 is used to generate assembly code 106, the operations can include compiling the source code 204 into the assembly code 106, as described above with respect to FIG. 2.

A suitable computing device can transmit the object code 114 to the radio device 110 via a suitable communication link 109. For example, a computing device 102 can be communicatively coupled to the radio device 110 via a serial data connection. The computing device 102 can transmit the object code 114 to the radio device 110 as byte-oriented data via the serial data connection. The radio device 110 can receive the object code 114 and store the object code 114 in a non-transitory computer-readable medium.

The method 1000 also involves receiving, by the computing device 102, a program counter entry via a communication link 109 with the radio device 110, as shown in block 1004. The program counter entry indicates that an execution of the object code 114 at the radio device 110 has paused.

In one example, the radio device 110 can be configured by the firmware 112 to execute a first operation of the object code 114 and then pause. In another example, the radio device 110 can be configured by the firmware 112 to pause an execution of the object code 114 at some point after the first operation. In either example, executing the object code 114 can cause the radio device 110 to generate log data 107. The log data 107 can be stored to a non-transitory computer-readable medium of the radio device 110.

The radio device 110 can transmit the log data 107 to the computing device 102 via a suitable communication link 109. For example, the computing device 102 can be communicatively coupled to the radio device 110 via a serial data connection. The radio device 110 can transmit the log data 107 to the computing device 102 as byte-oriented data via the serial data connection. The computing device 102 can receive the log data 107 and store the log data 107 in a non-transitory computer-readable medium.

The method 1000 also involves identifying a correspondence between the received program counter entry and a portion of the assembly code 106, as shown in block 1006. For example, the computing device 102 can execute the debugging application 104 to identify this correspondence.

In some aspects, the debugging application 104 can identify a correspondence between an initialized program counter entry and a corresponding portion of the assembly code 106. For example, the computing device 102 can transmit, via the communication link 109, an instruction to the radio device 110 to initialize a program counter at the radio device 110. The firmware 112 executed at the radio device 110 can respond to the instruction by initializing the program counter at the radio device 110. The firmware 112 can configure the radio device 110 to transmit a program counter entry (e.g., a value of the initialized program counter) to the computing device 102. The debugging application 104 can match an initial operation performed by the execution of the object code 114 with the assembly code used to generate the object code responsible for the initial operation (e.g., the assembly code portion 302a used to generate the object code portion 610a, as depicted in FIG. 6).

In additional or alternative aspects, the debugging application 104 can identify a correspondence between another program counter entry and a corresponding portion of the assembly code 106. In one example, the debugging application 104 can identify the correspondence as described above with respect to FIG. 7. In another example, the debugging application can receive an initial program counter entry from the radio device 110. This initial program counter entry, which may be a non-zero program counter value, can be received prior to the program counter entry received at block 1002. The initial program counter entry can correspond to an initial operation performed by the execution of the object code at the radio device (e.g., a first opcode). The debugging application 104 can synchronize a simulated program counter 604 using the initial program counter entry. The debugging application 104 can also generate, using the simulated program counter 604, one or more additional simulated program counter entries corresponding to simulated operations in the simulated execution 608. Thus, if the debugging application 104 receives a subsequent program counter entry at block 1002, the debugging application 104 can match received program counter entry to a simulated program counter entry. The debugging application 104 can use this match to identify the assembly code portion that corresponds to the object code portion whose execution generated the program counter entry received at block 1002.

The method 1000 also involves generating, based on the correspondence, a list of additional program counter entries 108 at which the execution of the object code is to be paused, as shown in block 1008. For example, a computing device 102 can execute the debugging application 104 and thereby use the simulated program counter values depicted in FIGS. 6 and 7 to generate the list of additional program counter entries 108. The debugging application 104 can identify portions of the assembly code associated with breakpoints, such as the assembly code portions 302b, 302n associated with respective breakpoint indicators 614a, 614b. The debugging application 104 can identify, based on the simulated execution 608, simulated program counter entries corresponding to the portions of the assembly code associated with the breakpoints (e.g., the simulated program counter entries 606b, 606b depicted in FIG. 6 or the simulated program counter entries 706b, 706b depicted in FIG. 7). The debugging application 104 can select the additional program counter entries 108 from the simulated program counter entries corresponding to the breakpoints.

The method 1000 also involves transmitting, from the computing device 102 to the radio device 110, the list of additional program counter entries 108, as shown in block 1010. For example, the computing device 102 can execute the debugging application 104, which can configure the computing device 102 to transmit the program counter entries 108 to the radio device 110 via the communication link 109. The firmware 112 can use the program counter entries 108 to pause execution of the object code 114 at the radio device 110.

The method 1000 also involves displaying electronic log data 107 obtained from the radio device 110 after a pause in the execution of the object code 114 at one of the additional program counter entries 108, as depicted in block 1012. For example, a computing device 102 can execute the debugging application 104 to display additional log data 107 that is obtained from the radio device 110 via the communication link 109. The log data 107 can be displayed in any suitable interface, such as the interfaces depicted in FIGS. 8 and 9.

In some aspects, the electronic log data 107 can include one or more register values. Examples of these register values include (but are not limited to) the accumulator value, flag value, program counter value, and R, V, M and S register values. In some aspects, the debugging application 104 can be used to modify one or more register values on the radio device 110 during a pause in execution of the object code 114 at the radio device 110. For example, the debugging application 104 can cause the computing device 102 to transmit an instruction to the radio device 110 for altering register values. The firmware 112 can respond to the command by altering one or more of the registers (e.g., accumulator, flag, program counter, R, V, M and S registers, etc.) while firmware 112 has paused the execution of the object code 114. In some aspects, an instruction to reset the program counter value to zero can be treated, by the firmware 112, as an instruction to re-initialize the execution of the object code 114 at the radio device 110.

In additional or alternative aspects, the electronic log data 107 can include information regarding virtual memory. For example, the debugging application 104 can be used to display one or more virtual memory values when firmware 112 has paused the execution of the object code 14. In some aspects, the debugging application 104 can be used to perform operations such as poking memory values on the radio device 110, changing a memory dump address, or monitoring user-defined watches for virtual memory.

In additional or alternative aspects, the electronic log data 107 can include information regarding virtual memory. For example, the debugging application 104 can be used to display one or more virtual memory values when firmware 112 has paused the execution of the object code 14.

In additional or alternative aspects, the electronic log data 107 can include information regarding an output buffer used during the execution of the object code 114. For example, the debugging application 104 can be used to display one or more virtual output buffer values corresponding to respective executions of object code instructions.

Figure 11:
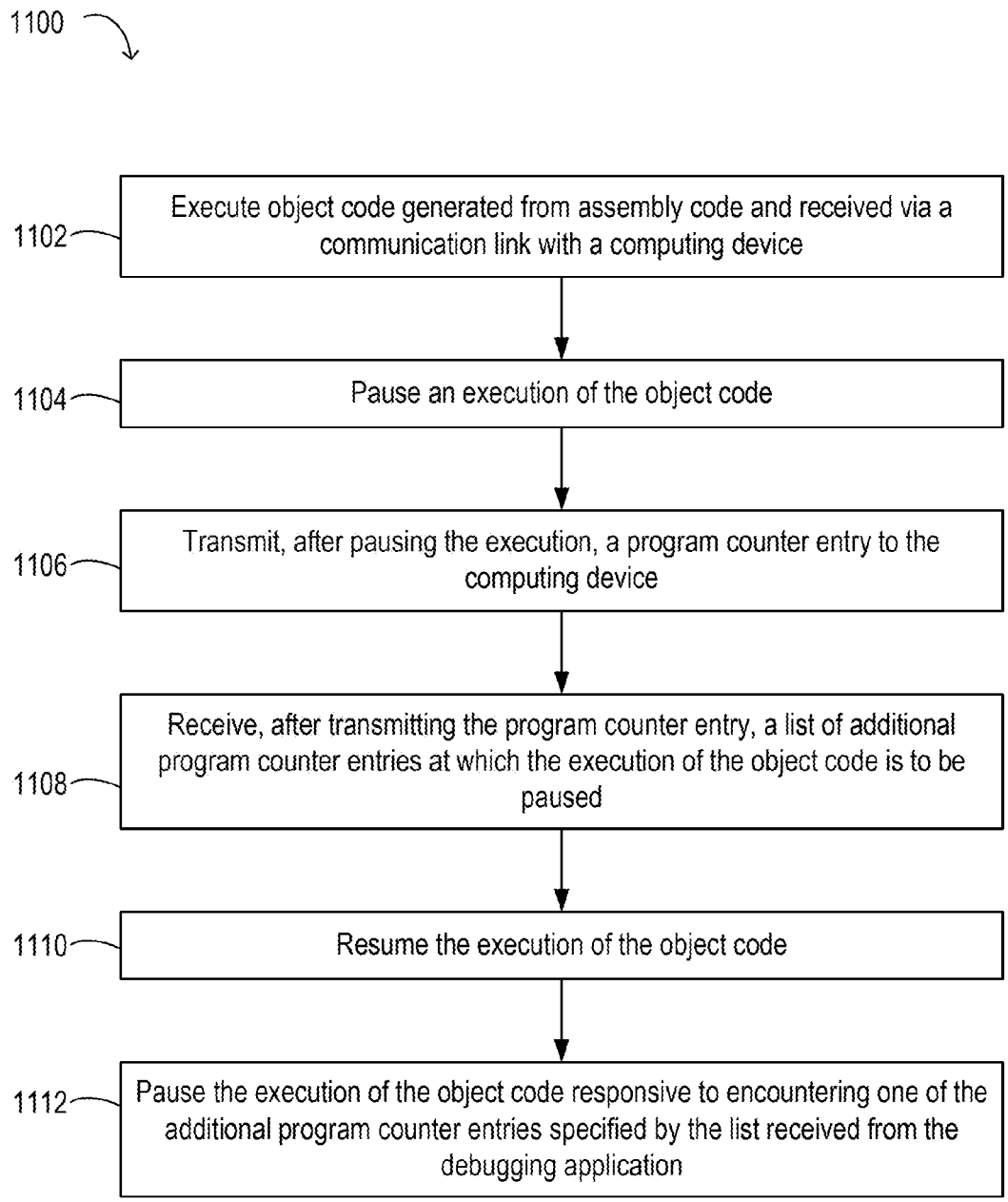
FIG. 11 is a flow chart depicting an example of a method for using a radio device or other resource-constrained intelligent device to debug code contemporaneously with executing, on the intelligent device, object code that is generated from the debugged code.

FIG. 11 is a flow chart depicting an example of a method 1100 for using a radio device 110 or other resource-constrained intelligent device to debug code contemporaneously with executing, on the intelligent device, object code that is generated from the debugged code. For illustrative purposes, the method 1100 is described with reference to the implementation depicted in FIGS. 1-9. Other implementations, however, are possible.

The method 1100 involves executing, on a radio device 110 or other intelligent device, object code 114 generated from assembly code 106 and received via a communication link 109 with a computing device 102, as shown in block 1102. For example, one or more processing devices on a radio device 110 or other intelligent device can access and execute firmware 112 installed on the radio device 110 or other intelligent device. The firmware 112 can perform one or more operations specified by the object code 114 (e.g., one or more opcodes included in a hex file that has been installed on the radio device 110).

The method 1100 also involves pausing an execution of the object code 114, as shown in block 1104. For example, the firmware 112 can pause execution of the object code 114 after performing one or more operations specified by the object code 114. In some aspects, the firmware 112 can pause the execution in response to the radio device 110 receiving an instruction from the computing device 102 via a communication link 109. For example, the firmware 112 can receive a debug command provided by the debugging application 104.

The method 1100 also involves transmitting, after pausing the execution, a program counter entry to the computing device, as shown in block 1106. The program counter entry indicates that an execution of the object code 114 at the radio device 110 has paused. In some aspects, the radio device 110 or other intelligent device can transmit log data to and receive commands from the computing device 102 as byte-oriented data via the serial data connection.

In some aspects, the program counter entry can be a value of an initialized program counter on the radio device 110. For example, the radio device 110 can receive, from the computing device 102, an instruction to initialize the program counter on the radio device 110. The firmware 112 can respond to the instruction by initializing the program counter (e.g., setting the program counter to zero or some other default value used for debugging purposes).

In one example, the radio device 110 can be configured by the firmware 112 to execute a first operation of the object code 114 and pause the execution after the first operation has been performed. In another example, the radio device 110 can be configured by the firmware 112 to pause an execution of the object code 114 at some point after the first operation. In either example, executing the object code 114 can cause the radio device 110 to generate log data 107. The log data 107 can be stored to a non-transitory computer-readable medium of the radio device 110.

The radio device 110 can transmit the log data 107 to the computing device 102 via a suitable communication link 109. For example, the computing device 102 can be communicatively coupled to the radio device 110 via a serial data connection. The radio device 110 can transmit the log data 107 to the computing device 102 as byte-oriented data via the serial data connection. The computing device 102 can receive the log data 107 and store the log data 107 in a non-transitory computer-readable medium.

The method 1100 also involves receiving, after transmitting the program counter entry, a list of additional program counter entries at which the execution of the object code is to be paused, as shown in block 1108. For example, the radio device 110 can receive the list of program counter entries 108 via the communication link 109. The firmware 112 can use the program counter entries 108 to pause execution of the object code 114 at the radio device 110.

The method 1100 also involves resuming the execution of the object code, as shown in block 1110. For example, the firmware 112 can receive a resume command from the debugging application 104. The firmware 112 can perform, responsive to receiving the resume command, one or more additional operations specified by the object code 114.

The method 1100 also involves pausing the execution of the object code responsive to encountering one of the additional program counter entries specified by the list received from the debugging application, as show in block 1112. For example, the firmware 112 can monitor a program counter on the radio device 110 while the object code 114 is being executed. The firmware 112 can compare the program counter value to the list of program counter entries 108 received from the debugging application 104. If the value of the program counter on the radio device 110 matches a program counter value on the list of program counter entries 108, the firmware 112 can pause execution of the object code 114. In this manner, the firmware 112 can provide a breakpoint functionality (e.g., pausing execution after performing a command corresponding to a particular program counter value) without requiring breakpoints to be inserted into the object code 114.

The method 1100 also involves transmitting, to the computing device 102 executing the debugging application 104, electronic log data 107 after pausing the execution. For example, the firmware 112 can store one or more register values, memory values, or other values to a non-transitory computer-readable medium during execution of the object code 114. The firmware 112 can provide at least some of these stored values as the log data 107. The firmware 112 can configure the radio device 110 to transmit the log data to the computing device 102, which can display the log data in any suitable interface, such as the interfaces depicted in FIGS. 8 and 9.

In some aspects, the debugging application 104 can be used to step through one or more operation of the object code 114 being executed on the radio device. For example, an instruction to perform a subset of operations specified by the object code 114 can be transmitted by the computing device 102 and received by the radio device 110. The firmware 112 can respond to the instruction by performing the subset of operations after resuming the execution from a pause, such as a pause corresponding to one of additional program counter entries 108. The firmware 112 can again pause the execution based on completing the subset of operations.

The computing device 102 and the radio device 110 can be implemented in any suitable manner. For example, FIG. 12 is a block diagram depicting examples of implementations for the computing device 102 and the radio device 110.

The computing device 102 and the radio device 110 can respectively include processors 1202, 1212. Non-limiting examples of the processors 1202, 1212 include a microprocessor, a field-programmable gate array ("FPGA") an application-specific integrated circuit ("ASIC"), or other suitable processing device. Each of the processors 1202, 1212 can include any number of processing devices, including one. The processors 1202, 1212 can be communicatively coupled to computer-readable media, such as memory devices 1204, 1214.

One or both of the memory devices 1204, 1214 can store program code that, when executed by the processors 1202, 1212, causes a respective one of the processors 1202, 1212 to perform operations described herein. Each of the memory devices 1204, 1214 may include one or more non-transitory computer-readable media such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. Examples of the program code include the debugging application 104 stored in the memory device 1204, and the firmware 112 and object code 114 stored in the memory device 1214. The program code may include processor-specific instructions generated by a compiler and/or an interpreter from code written in any suitable computer-programming language. Non-limiting examples of suitable computer-programming languages include C, C++, C#, Visual Basic, Java, Python, Perl, JavaScript, ActionScript, and the like.

Figure 12:
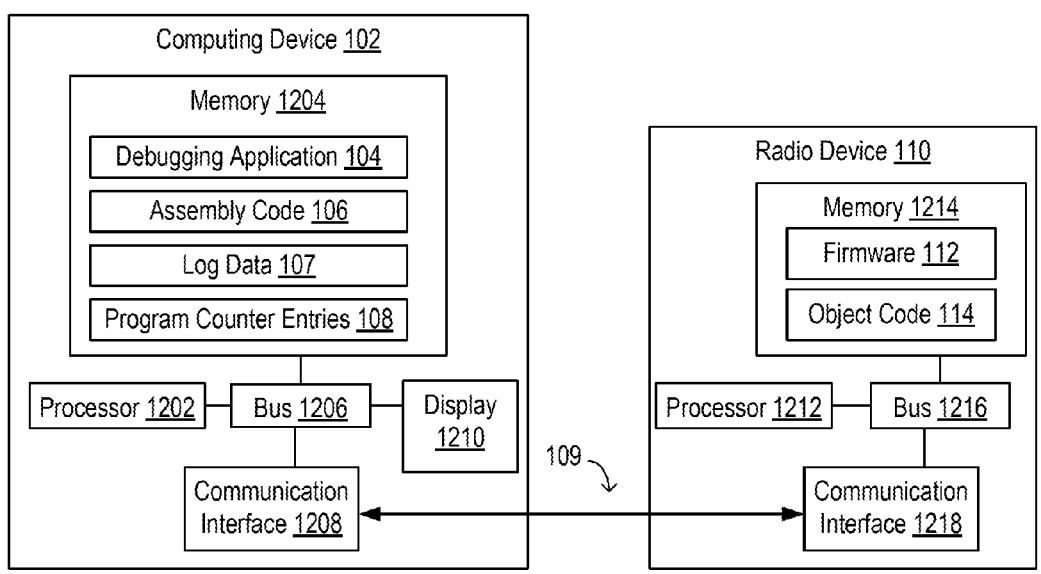
FIG. 12 is a block diagram depicting examples of implementations for devices used to debug code for controlling radio devices and other resource-constrained intelligent devices contemporaneously with executing object code on the intelligent device.

The computing device 102 and the radio device 110 depicted in FIG. 12 respectively include buses 1206, 1216. Each of the buses 1206, 1216 can communicatively couple one or more components of a respective one of the computing device 102 and the radio device 110. Each of the buses 1206, 1216 can communicate input events and output events among components of the computing device 102 and the radio device 110, respectively. For example, the computing device 102 can include one or more input devices and one or more output devices, such as a display device 1210. The one or more input devices and one or more output devices can be communicatively coupled to the bus 1206. The communicative coupling can be implemented via any suitable manner (e.g., a connection via a printed circuit board, connection via a cable, communication via wireless transmissions, etc.). Non-limiting examples of a display device 1210 include an LCD screen, an external monitor, a speaker, or any other device that can be used to display or otherwise present outputs generated by a computing device 102.

Although the processors 1202, 1212, the memory devices 1204, 1214, and the buses 1206, 1216 are respectively depicted in FIG. 12 as separate components in communication with one another, other implementations are possible. For example, the processors 1202, 1212, the memory devices 1204, 1214, and the buses 1206, 1216 can be respective components of respective printed circuit boards or other suitable devices that can be included in a computing device 102 and/or a radio device 110.

The computing device 102 and the radio device 110 can also include respective communication interfaces 1208, 1218. The communication interfaces 1208, 1218 can be configured to establish a communication link 109. Non-limiting examples of the communication interfaces 1208, 1218 include serial data ports that can be used to communicate data using a byte-oriented protocol.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

The features discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these, and similar terms, are to be associated with appropriate physical quantities and are merely convenient labels. Unless specifically stated otherwise, it is appreciated that throughout this specification, discussions utilizing terms such as "processing," "computing," "calculating," "determining," and "identifying" or the like refer to actions or processes of a computing device, such as one or more computers or a similar electronic computing device or devices, that manipulates or transforms data represented as physical electronic or magnetic quantities within memories, registers, or other storage devices, transmission devices, or display devices of the computing platform.

The system or systems discussed herein are not limited to any particular hardware architecture or configuration. A computing device can include any suitable arrangement of components that provide a result conditioned on one or more function calls. Suitable computing devices include multi-purpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied; for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A system for real-time debugging of code for controlling radio devices, the method comprising:
a plurality of radio devices included in or communicatively coupled to utility meters, each radio device comprising a non-transitory computer-readable medium having firmware installed thereon, each utility meter configured for communicating with another utility meter in a mesh network for monitoring consumption of a resource at a building or structure; and
a computing device communicatively coupled to at least one of the radio devices, wherein the computing device is configured for:
transmitting, to the radio device, object code generated from assembly code,
obtaining a program counter entry via a communication link with the radio device, wherein the program counter entry indicates that an execution of the object code at the radio device has paused and identifies an operation performed by the execution of the object code at the radio device prior to or after the execution of the object code at the radio device being paused,
identifying a correspondence between the program counter entry and a portion of the assembly code,
generating a list of additional program counter entries at which the execution of the object code is to be paused,
transmitting the list of additional program counter entries, and
displaying, by the computing device, electronic log data obtained from the radio device after a pause in the execution of the object code at one of the additional program counter entries;
wherein the at least one of the radio devices is configured for:
executing, by the firmware, the object code,
pausing, by the firmware, the execution of the object code,
transmitting, after pausing the execution, the program counter entry to the computing device,
receiving the list of additional program counter entries,
resuming, by the firmware, the execution of the object code,
pausing, by the firmware, the execution responsive to encountering one of the additional program counter entries specified by the list, and
transmitting the electronic log data to the computing device after a pause in the execution at one of the additional program counter entries.

2. The system of claim 1, wherein identifying the correspondence between the program counter entry and the portion of the assembly code comprises:
receiving an initial program counter entry from the radio device corresponding to an initial operation performed by the execution of the object code at the radio device;
performing a simulated execution of the object code;
generating, based on the initial program counter entry, a simulated program counter entry corresponding to a simulated operation in the simulated execution of the object code; and
matching the simulated program counter entry to the program counter entry obtained from the radio device.

3. The system of claim 1, wherein the computing device is further configured for comprising transmitting, to the radio device, an instruction to initialize a program counter at the radio device;
wherein the radio device is further configured for:
initializing the program counter in response to receiving the instruction; and
transmitting the program counter entry having a value of the initialized program counter.

4. The system of claim 1, wherein generating the list of additional program counter entries at which the execution of the object code is to be paused comprises:
identifying portions of the assembly code associated with breakpoints;
performing a simulated execution of the object code;
identifying, based on the simulated execution, simulated program counter entries corresponding to the portions of the assembly code associated with the breakpoints; and
selecting the additional program counter entries from the simulated program counter entries.

5. The system of claim 1, wherein the computing device is further configured for transmitting, to the radio device, an instruction to perform only a subset of operations specified by the object code after resuming the execution after the pause;
wherein the radio device is further configured for:
receiving the instruction; and
performing the subset of operations after resuming the execution from the pause specified by the one of the additional program counter entries.

6. The system of claim 1, wherein the computing device and the radio device are communicatively coupled via a serial data connection, wherein the radio device is configured for transmitting the electronic log data as byte-oriented communication data via the serial data connection.

7. A method for real-time debugging of code for controlling radio devices, the method comprising:
transmitting, to a radio device, object code generated from assembly code and executable by firmware installed on the radio device;
receiving, by a computing device separate from the radio device, a program counter entry via a communication link with the radio device, wherein receiving the program counter entry indicates that an execution of the object code at the radio device has paused;
identifying, by the computing device, a correspondence between the received program counter entry and a portion of the assembly code;
generating, by the computing device and based on the correspondence, a list of additional program counter entries at which the execution of the object code is to be paused;
transmitting, from the computing device to the radio device, the list of additional program counter entries; and displaying, by the computing device, electronic log data obtained from the radio device after a pause in the execution of the object code at one of the additional program counter entries.

8. The method of claim 7, further comprising transmitting, to the radio device with the object code, an instruction to initialize a program counter at the radio device, wherein the obtained program counter entry corresponds to the initialized program counter, wherein identifying the correspondence between the program counter entry and the portion of the assembly code comprises matching (i) an initial operation performed by the execution of the object code with (ii) the assembly code used to generate the object code responsible for the initial operation.

9. The method of claim 7, wherein identifying the correspondence between the program counter entry and the portion of the assembly code comprises:

receiving an initial program counter entry from the radio device, the initial program counter entry corresponding to an initial operation performed by the execution of the object code at the radio device, wherein the initial program counter entry is received prior to the program counter entry;

performing a simulated execution of the object code;

generating, based on the initial program counter entry, a simulated program counter entry corresponding to a simulated operation in the simulated execution of the object code; and matching, after receiving the program counter entry, the simulated program counter entry to the program counter entry obtained from the radio device.

10. The method of claim 7, wherein generating the list of additional program counter entries at which the execution of the object code is to be paused comprises:

identifying portions of the assembly code associated with breakpoints;

performing a simulated execution of the object code;

identifying, based on the simulated execution, simulated program counter entries corresponding to the portions of the assembly code associated with the breakpoints; and selecting the additional program counter entries from the simulated program counter entries.

11. The method of claim 7, further comprising transmitting, from the computing device to the radio device, an instruction to perform only a subset of operations specified by the object code after resuming the execution after the pause.

12. The method of claim 7, wherein the electronic log data comprises a plurality of register values, wherein each of the plurality of register values corresponds to a respective program counter entry, wherein method further comprises transmitting, from the computing device to the radio device during the pause, an instruction to modify one of the plurality of register values.

13. The method of claim 7, wherein the electronic log data further comprises at least one of:

virtual memory information specified via a user-defined watch;

a plurality of register values, wherein each of the plurality of register values corresponds to a respective program counter entry; or an output buffer value.

14. The method of claim 7, wherein the communication link comprises a serial data connection, wherein the computing device obtains the electronic log data from the radio device as byte-oriented communication data received via the serial data connection with the radio device.

15. A method for real-time debugging of code for controlling radio devices, the method comprising:

executing, by firmware installed on a radio device, object code generated from assembly code and received via a communication link with a computing device;

pausing an execution of the object code;

transmitting, after pausing the execution, a program counter entry to the computing device, the program counter entry indicating that the execution has paused;

receiving, by the radio device after transmitting the program counter entry, a list of additional program counter entries at which the execution of the object code is to be paused;

resuming the execution of the object code;

pausing, by the firmware, the execution responsive to encountering one of the additional program counter entries specified by the list; and transmitting, from the radio device to the computing device, electronic log data after pausing the execution responsive to encountering the one of the additional program counter entries.

16. The method of claim 15, further comprising:

receiving, by the radio device from the computing device, an instruction to initialize a program counter; and initializing, by the radio device, the program counter responsive to receiving the instruction, wherein the transmitted program counter entry has a value of the initialized program counter.

17. The method of claim 15, further comprising:

receiving, by the radio device from the computing device, an instruction to perform only a subset of operations specified by the object code;

performing, by the radio device, the subset of operations after resuming the execution from a pause specified by the one of the additional program counter entries; and pausing, by the radio device, the execution based on completing the subset of operations.

18. The method of claim 1, wherein the electronic log data comprises a plurality of register values, wherein each of the plurality of register values corresponds to a respective program counter entry, wherein method further comprises:

receiving, by the radio device during a pause specified by the one of the additional program counter entries, an instruction to modify one of the plurality of register values; and modifying, by the radio device and in response to the instruction, the one of the plurality of register values on the radio device.

19. The method of claim 1, wherein the electronic log data further comprises at least one of:

virtual memory information specified via a user-defined watch;

a plurality of register values, wherein each of the plurality of register values corresponds to a respective program counter entry; or an output buffer value.

20. The method of claim 1, wherein the communication link comprises a serial data connection and the radio device transmits the electronic log data as byte-oriented communication data via the serial data connection.

* * * * *